(12) United States Patent
Snmith

(10) Patent No.: US 6,460,940 B1
(45) Date of Patent: *Oct. 8, 2002

(54) SUPPLEMENTAL BRAKE SYSTEM

(76) Inventor: Ernest E. Snmith, 49700 Martz Rd., Belleville, MI (US) 48111

( * ) Notice: Subject to any disclaimer, the term of this patent is extended or adjusted under 35 U.S.C. 154(b) by 0 days.

This patent is subject to a terminal disclaimer.

(21) Appl. No.: 08/336,173

(22) Filed: Nov. 8, 1994

(51) Int. Cl.[7] ................................................ B60T 13/00
(52) U.S. Cl. .................... 303/7; 303/2; 303/13
(58) Field of Search ............................. 303/2, 3, 7, 13, 303/14, 15, 18, 19; 280/427, 428

(56) References Cited

U.S. PATENT DOCUMENTS

| | | | | |
|---|---|---|---|---|
| 3,420,579 A | * | 1/1969 | Kelly et al. ..................... | 303/13 |
| 3,617,099 A | * | 11/1971 | Suglyama et al. ......... | 303/13 X |
| 4,787,205 A | * | 11/1988 | Fontaine .................... | 303/13 X |
| 5,195,606 A | * | 3/1993 | Martyniuk ................. | 303/18 X |

\* cited by examiner

*Primary Examiner*—Pam Rodriguez
(74) *Attorney, Agent, or Firm*—Ernest E. Helms

(57) ABSTRACT

A supplemental brake system for a vehicle having its own primary braking system by which the vehicle may be slowed from a towing vehicle. The supplemental brake system includes a vacuum-operated servo unit that is connected to the brake pedal of the vehicle and has a pneumatic connection by which it can be connected to the towing vehicle.

10 Claims, 2 Drawing Sheets

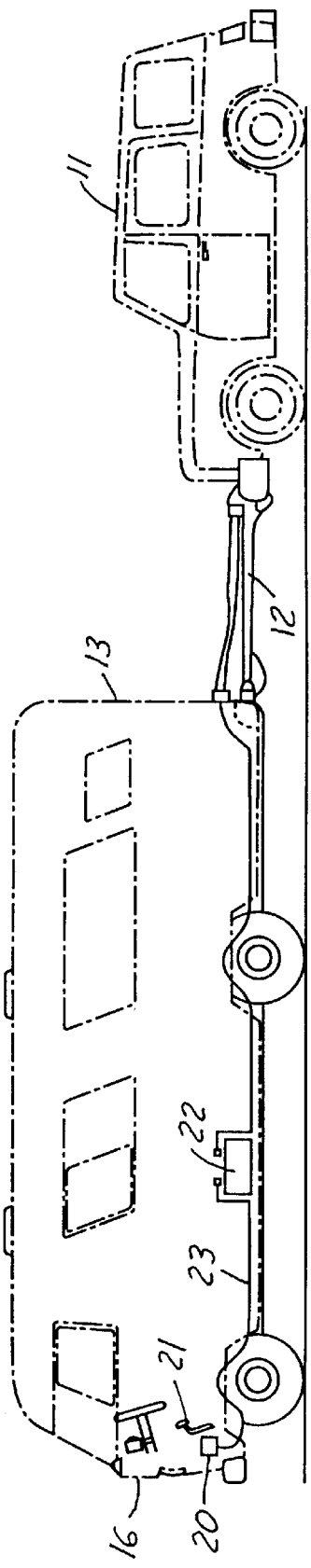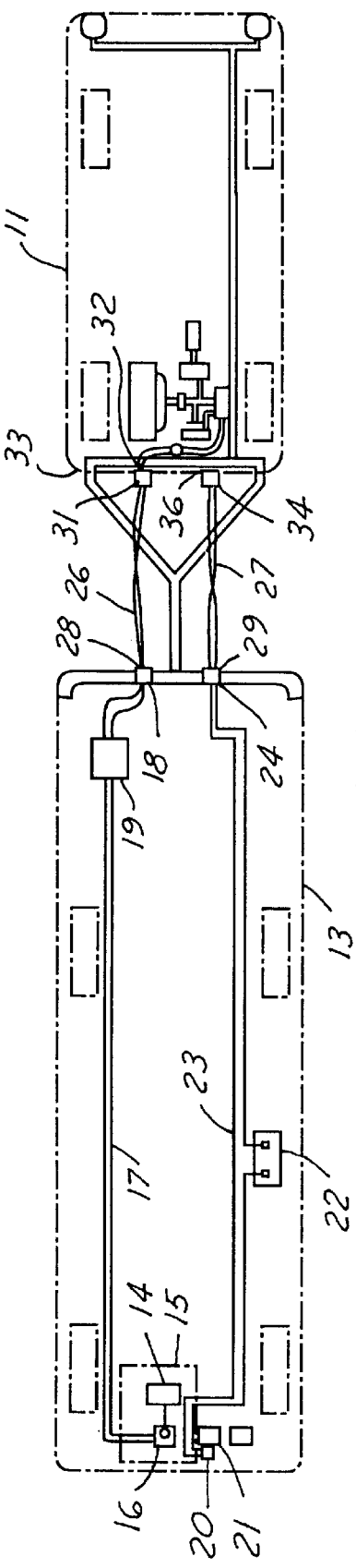

SUPPLEMENTAL BRAKE SYSTEM

BACKGROUND OF THE INVENTION

This invention relates to a supplemental, vacuum-operated brake system by which the brakes of a vehicle equipped with the supplemental system, in addition to the vehicle's main brake system, can be actuated from a vacuum system without the application of foot pressure on the brake pedal. In particular, the invention relates to a system in which a vacuum-responsive servo unit mounted in the vehicle and mechanically connected to the brake pedal can be connected pneumatically to the vacuum system of a towing vehicle and controlled either by a valve located in the towing vehicle and in series with the vacuum system in the latter vehicle, or by an electric circuit controlled by a switch actuated by the brake pedal in the towing vehicle.

The term "vacuum" is used throughout the following description and claims in the sense in which it is commonly used by persons familiar with automotive brake systems as indicating a pressure much lower than atmospheric pressure although as much as several pounds per square inch higher than absolute vacuum.

When a vehicle being towed either has no brakes or has brakes that are not being operated, the towed vehicle tends to push the towing vehicle forward when the brakes of the latter are applied. This requires that the force applied to the brakes of the towing vehicle be increased, which not only wears out those brakes more rapidly than would otherwise be the case but, in extreme cases of abrupt stops, can make the connected vehicles very unstable.

Trucks that tow large semi-trailers used to haul heavy loads are equipped with air-operated brakes, as are the semi-trailers, so that the force applied to the brake pedal by the driver is greatly augmented by compressed air and applied to both the truck brakes and the trailer brakes in proportion to the driver's foot pressure on the pedal. Thus, if the driver presses hard on the brake pedal in the truck, all of brakes in both the truck and the semi-trailer will be applied forcefully, while, if the driver applies only light pressure, all of the brakes in the truck and the semi-trailer will be lightly applied. This is a full-time brake system for such vehicles and is not the sort of operation contemplated for this invention. In addition, semi-trailers do not have a separate brake system and are not driven as separate vehicles.

U.S. Pat. No. 5,031,729 to Wittkop et al shows a cement mixer being towed with its front end attached to a crane on a tow truck. The invention includes a bar that has an air cylinder extending longitudinally from one end and a piston rod extending in the same direction from the air cylinder to engage the brake pedal. At the other end of the bar is a yoke to attach that end of the bar to the steering wheel of the vehicle being towed, which prevents the steering wheel of that vehicle from turning and makes it necessary to tow it with its front wheels off the ground. An air compressor in the tow truck supplies compressed air to the cylinder under the control of the brake pedal of the tow truck to force the piston rod to press down on the brake pedal of the cement mixer and apply brake pressure to the rear wheel brakes of the latter to help stop both vehicles.

Another form of brake system is shown in U.S. Pat. No. 4,635,758 to Beard. That patent shows a motor home towing a small car. While the vehicle being towed has all four of its wheels on the ground, the motor home has a second master cylinder to transmit hydraulic pressure from the motor home to the hydraulic system of the car. The brakes of the car are not vacuum-actuated.

U.S. Pat. No. 4,249,643 to Yoder and U.S. Pat. No. 4,763,958 to Öbgard show brake systems involving tractor-trailer vehicles. The trailers never operate independently of the tractors and do not have their own independent brake systems.

The type of vehicle in which the supplemental brake system of this invention is to be used is one that is capable of being driven separately when it is not being towed and which, therefore, has its own main brake system with a brake pedal and brakes. In accordance with this invention, the supplemental brake system is connected to the brake pedal and, thus, to the brakes of the vehicle to apply force to the brake pedal in the absence of any other force applied directly to the brake pedal. In addition, the supplemental brake system of this invention does not interfere with the steering system. Therefore, all of the wheels of the vehicle can be on the ground when the vehicle is being towed.

Such a supplemental brake system is especially, although not exclusively, useful in a vehicle intended to be towed by a motor home or other recreational vehicle. At the end of a journey or a part thereof, the towed vehicle can be easily released so that it can be driven locally while the towing vehicle remains in one spot, either at a temporary location, such as a camp ground, or a more permanent location, such as its home base.

OBJECTS AND SUMMARY OF THE INVENTION

One object of this invention to provide a supplemental brake system separate from the main brake system of a vehicle so that braking can be effected without the necessity of having a driver apply force to the brake pedal of the vehicle.

Another object is to arrange all controls of the supplemental system and all parts connecting the supplemental system to a towing vehicle so that the manipulation and actuation of such parts can be carried out in as unambiguous and fail-safe a manner as possible whether the vehicle that has the supplemental system is connected to or is disconnected from a towing vehicle.

Still another object is to provide a vehicle with a supplemental brake system that makes it possible to tow that vehicle without supporting the front wheels of that vehicle clear of the pavement.

Yet another object is to make it possible to tow larger vehicles more safely.

A further object is to make both the release of a towed vehicle from a towing vehicle and the reconnection to the towing vehicle easy to accomplish.

Still another object is to provide a two-vehicle system in which actuation of a supplemental brake system in the towed vehicle from the towing vehicle applies the brakes in the towed vehicle to a fixed extent that is less than the maximum amount possible.

After persons skilled in the technology of automotive brake systems have studied the following description, further objects of this invention may become apparent to them.

The supplemental brake system for a vehicle in accordance with this invention includes a vacuum-operated servo unit, such as the type of servo unit used in cruise control systems. The servo unit is rigidly mounted in the vehicle and has an evacuable chamber between a stationary wall and a movable wall, or diaphragm, resiliently pushed away from the stationary wall. Pneumatic means through which a chamber in the servo unit can be evacuated are connected to the chamber, and mechanical means connect the diaphragm to the brake pedal of the vehicle to apply braking force to the pedal in response to vacuum actuation of the servo unit. The supplemental brake system also includes valve means by which the main vacuum line of the primary brake system of the vehicle can be separated from the engine manifold of that vehicle while the supplemental brake system is being used and by which the main vacuum system and the supplemental vacuum line can be sealed from the atmosphere when the vehicle is running free.

A second vehicle to be used to tow a vehicle equipped with a supplemental brake system in accordance with this invention has a vacuum line that extends from a vacuum source, such as the intake manifold in the towing vehicle, to the rear of that vehicle to be connected to the pneumatic means of the towed vehicle to form a complete vacuum path. The towing vehicle has a control operated by the driver of that vehicle to actuate the supplemental brake system of the towed vehicle, but neither the brake system of the towing vehicle nor the primary brake system of the vehicle provided with a supplemental brake system need be modified, and both vehicles can be driven separately.

The braking action obtained by operation of the supplemental brake system is preferably only great enough to reduce the pushing effect of that vehicle on the towing vehicle during a stop but not enough to lock the wheels of the towed vehicle, and it need not be modulated according to the braking force being used in the towing vehicle.

In one embodiment of this invention, a pneumatic switch easily accessible to the driver of the towing vehicle is connected in series with the vacuum line to the rear of that vehicle. When the driver sets the pneumatic switch to a position in which the complete vacuum path is open from the vacuum source in the towing vehicle to the servo unit in the vehicle being towed, the diaphragm wall of the chamber in the servo unit is moved against the pressure of its spring and, through the mechanical connection, applies braking pressure to the brake pedal of the vehicle being towed. In the release position, the diaphragm is allowed to be moved in the opposite direction by a spring in the servo unit, thereby reducing pressure on the brake pedal.

An alternative embodiment makes use of the fact that the chamber of a cruise control servo unit typically has an electrically operated solenoid valve between the chamber and the vacuum line connected thereto. As in the first embodiment, the vacuum source of the towing vehicle is connected by way of the complete vacuum path to the servo unit of the towed vehicle, but unlike the first embodiment, this vacuum connection is always open all the way to an electrically operated valve at a location on the chamber of the servo unit to which the pneumatic connection is attached. Also, as in the first embodiment, an electrical connection extends from the brake light switch of the towing vehicle to the brake lights of the towed vehicle as required by law.

However, in the second embodiment, the brake light line in the towed vehicle is also connected to the electrically operated valve that controls access from the pneumatic connection to the chamber of the servo unit. When the driver of the towing vehicle depresses the brake pedal, this electrically operated valve is actuated by electric current through the brake light switch of the towing vehicle to open the passageway into the chamber from the vacuum path, thereby allowing the chamber to be evacuated to apply a braking force to the brake pedal of the towed vehicle. Since the vacuum path is always evacuated all the way from the vacuum source in the towing vehicle to the servo unit in the towed vehicle, opening the passageway allows the vacuum to have immediate effect in applying pressure to the brake pedal, rather than having to wait until air is evacuated from all of parts of the vacuum path from the vacuum source in the towing vehicle to the chamber in the servo unit. When the driver of the towing vehicle releases pressure on the brake pedal of the towing vehicle, the solenoid is deenergized, which allows air to enter the chamber and return the diaphragm and the brake pedal to their respective non-braking positions. Air may reenter through a small bleed hole in a wall of the chamber.

The invention will be described in greater detail in connection with the drawings.

BRIEF DESCRIPTION OF THE DRAWINGS

FIG. 1 is a side view of some of the key components of a supplemental brake system according to the invention as installed in a motor home shown in phantom towing an automobile that is also shown in phantom.

FIG. 2 is a top view of the components and the vehicles of FIG. 1.

DETAILED DESCRIPTION OF THE INVENTION

Figure 3:
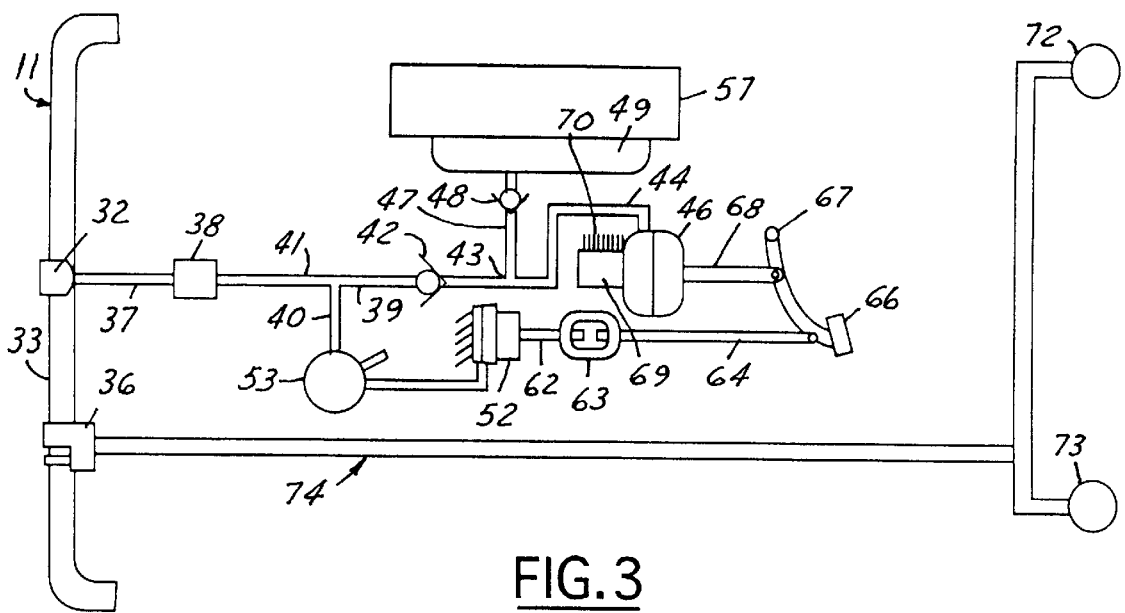
FIG. 3 is a cross-sectional view of a simplified servo unit as used in the invention.

FIGS. 1 and 2 show a first vehicle 11 connected by a tow bar 12 to be towed by a second vehicle 13, which is illustrated as a recreational vehicle and, specifically, a motor home, although other types of vehicles may be used instead, if they have sufficient towing power and the ability to produce a vacuum, or, more precisely, a reduced pressure, for operating a vacuum servo unit. The braking force made available by the supplemental brake system of this invention allows the vehicle 11 being towed to be of substantial size since the brake system of the vehicle 13 is not required to do all of the braking for both vehicles. In FIGS. 1 and 2, the vehicle 11 is illustrated as a full-sized automobile, although the system will also work with trucks light enough to be towed by the vehicle 13 and, of course, with cars smaller than full size.

Both vehicles 13 and 11 are essentially standard models of their respective types, and the components described in some detail are primarily those used in the supplemental brake system of this invention. In addition, the vehicles are shown equipped with supplemental brake components capable of operating in either of two modes, although some of the components illustrated are used in only one of the modes, while other components are used only in the other mode.

Some of the components used in the supplemental brake system are already present in the vehicles as standard apparatus, such as an evacuable chamber, or vacuum source, 14, which may be the intake manifold of the engine 15 or may be an additional vessel connected to the manifold. A pneumatic switch 16 is located to be convenient to the driver of the vehicle 13, for example on the steering column, and is connected to a vacuum line, or hose, 17 that extends to the rear of the vehicle and terminates in an automatic-closing connector 18. A typical vacuum line filter 19 is shown connected in series with the line 17, although it is not necessary to include a filter.

An electric switch 20, which may be a standard brake light switch, is located where it will be actuated by any pressure applied to a brake pedal 21 in the vehicle 13 and is typically connected in series with a battery 22 and an electric cable 23 that also extends to the rear of the vehicle 13 where it terminates in an electric connector 24 that may be of the type used to make electrical connection to towed vehicles to operate their stop lights when they are being towed.

In addition to the mechanical connection provided by the tow bar 12, the vehicles are also connected together by a vacuum line 26 and an electric cable 27. The connector vacuum line 26 has a vacuum connector 28 at one end to be connected, as shown, to the connector 18, and the electric cable 27 that has an electrical connector 29 at one end to be connected to the connector 24. At the other end of the vacuum line 26 linking the vehicles 11 and 13 together is another connector 31 connected to a self-closing connector 32 mounted at the front of the vehicle, and in this instance, on the front bumper 33. The electric cable 27 has, at its other end, another connector 34 connected to a connector 36. Both the connectors 34 and 36 may be identical 2-wire connectors of the type commonly used in towing operations.

The vehicles as illustrated in FIGS. 1 and 2 are capable of operating in either of two modes. One mode of operation is illustrated by the arrangement of components in the vehicle 11 in FIG. 3. In this mode, the connector 32 is at the end of a vacuum connection line 37, which is shown as including a filter 38. The line 37 divides into two lines 39 and 40 at a Tee junction 41. The line 39 leads through a check valve 42 to a second Tee junction 43 from which one line 44 leads on to a vacuum booster 46, in this embodiment, and the other line 47 leads through a check valve 48 to the intake manifold 49 of the engine 51 of the vehicle 11. The check valve 42 allows air to be drawn out of the booster 46 into the vacuum lines 39, 37, 26, and 17 to the chamber 14 in the vehicle 13, as shown in FIG. 2 when that vehicle is towing the vehicle 11 but prevents air from passing through the lines 39 and 47 to the booster when the vehicle is running free. The check valve 48 allows air to be drawn out of the booster 46 into the intake manifold 49, or any evacuated vessel connected to that manifold, when the vehicle 11 is running free, under the power of its own engine, but prevents air from being drawn through the manifold 49 into the line 44 and the booster 46 when the vehicle 11 is being towed and its engine 51 is not running. Instead, when the vehicle 11 is being towed by a vehicle equipped as is the vehicle 13, the booster 46 is evacuated through the whole vacuum path that includes the lines 47, 39, and 37 in the vehicle 11, the connecting line 26, and the vacuum line 17 to the chamber 14 in the vehicle 13. While this places the booster 46 in a condition to assist in applying the brakes of the vehicle 11, the booster, acting alone, does not carry out any braking from merely being placed in that condition. Braking is effected by evacuation of an internal chamber in a servo unit 52, but only when the driver of the vehicle 13 actuates the pneumatic switch 16 to open the passageway through a manually operated valve 53 and the vacuum lines 40, 37, 26, and 17 to the vacuum source 14.

Figure 4:
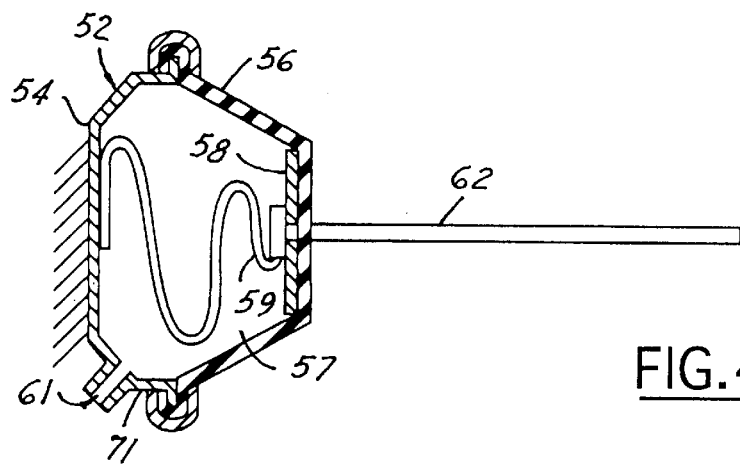
FIG. 4 is a schematic drawing of a complete supplemental brake system for one embodiment of the invention.

In the simplified representation in FIG. 4, the servo unit 52 comprises a rigid wall 54, which is illustrated as being mounted on a rigid support that is near the front of the vehicle 11 (FIG. 3), and an elastomeric sheet, or diaphragm, 56, and the perimeters of the wall and the sheet are sealed together airtight, thus defining a chamber 57. An inner, rigid plate 58 is pressed against the inner surface of the sheet 56 by a compression spring 59. There is at least one entrance 61 to the chamber 57, and this entrance is an element of pneumatic connection means by which the chamber 57 is operatively connected to the evacuable chamber 14 to draw air out of the chamber 57 when the driver of the vehicle 13 desires to apply the brakes in the vehicle 11 being towed. When that happens, the ambient air pressure outside of the chamber 57 pushes the wall 56 and, thereby, the plate 58 with a sufficient force to overcome the force of the spring 59 and collapse the chamber 57. As the plate 58 moves toward the rigid wall 54, it draws a rod 62 with it. One end of the rod 62 is rigidly joined to the elastomeric sheet 56, and the other end is threaded. As shown in FIG. 3, the threaded end of the rod 62 is screwed into a turnbuckle 63 in juxtaposition with a rod 64 connected to the brake pedal 66. The rod 62, the turnbuckle 63, and the rod 64 comprise mechanical connection means from the servo unit 52 to the brake pedal.

The purpose of the turnbuckle is to set the distance that the brake pedal is pivoted about its pivot pin 67 when all of the air is withdrawn from the chamber 57. This movement of the pedal 66 produces a braking effect that is the equivalent of having a driver step on the brake pedal. When the rod 64 pulls the pedal 66, a rod 68 moves a piston in a master brake cylinder 69 forcing hydraulic fluid out through brake lines 70 to the wheel cylinders to actuate the brakes 75 by applying pressure against the brake drums or discs in the customary way. Just as when a human driver is pressing directly on the brake pedal 66, movement of that pedal by the mechanical connection means 62–64 tends to slow the vehicle 11 somewhat, and this braking effect is augmented by pressure developed in the usual way in the booster 46.

When the vehicle 11 is being towed, the force exerted on the brake pedal by the mechanical connection means 62–64 when the chamber 57 is evacuated is always the same; it is not proportionate to the urgency of stopping the vehicle. All that is desired is that, in normal conditions, the vehicle should not push on the vehicle 13, but in the case of a panic stop, the vehicle 11 may push on the vehicle to some degree. One reason for limiting the braking force generated by the supplemental braking system in the vehicle 11 is that it is not desirable to have the mechanical connection means 62–64 apply the brakes so hard as to cause the wheels of the vehicle 11 to lock up, thereby causing a skid. Nor is it desirable to have the connection means apply so little braking force to the pedal 66 that the vehicle 11 pushes too hard on the towing vehicle 13.

The correct amount of braking force may be determined by connecting the vehicle 11 to the towing vehicle and adjusting the adjustable member 63 to an arbitrary setting, then driving the towing vehicle 13 and stopping the connected vehicles. If the vehicle 11 being towed is felt either to be pushing too much or is dragging too much during a stop, the member 63 can be readjusted and the process repeated until the driver of the towing vehicle is satisfied that the member 63 is set to the correct adjustment. Once the proper setting has been reached, the member 63 does not have to be readjusted more often than any other brake adjustment.

An alternative way of setting the adjustable member 63 to the proper value is carried out with the vehicles 11 and 13 stationary on level ground and connected together by the vacuum connecting line 26 but not the tow bar 12. The engine 15 of the towing vehicle is then started and run to evacuate the element 14, and the pneumatic switch 16 is set to evacuate the lines 17, 26, 37, 39, and 40 and the chamber 57 in the servo unit 52 to apply a braking force to the brakes of the vehicle 11. The engine of the vehicle 11 is then started and run at idling speed, and the shift lever of that vehicle is put into gear by someone sitting in its driver's seat. The braking effect obtained by operation of the servo unit, alone, without any other pressure on the brake pedal 66 should be sufficient to keep the that vehicle from moving. If the vehicle 11 is then slowly given enough gas to raise its engine speed above idling speed, it should start to move. If it moves even at idling speed, the member 63 should be adjusted to cause the brake pedal to be pulled farther forward by the servo unit 52 to apply greater braking force. On the other hand, if the vehicle 11 does not move even if its engine speed is raised above idling speed, the member 63 should be adjusted to cause the pedal 66 not to be pulled so far forward by the servo unit. Even after this adjustment, the driver of the towing vehicle 13 may feel that, in over-the-road operation, the vehicle 11 is either pushing too hard or is dragging too much during a stop. In either case, the member 63 can be readjusted at the next stop or as soon as it is convenient to do so.

Each time the driver of the vehicle 13 in FIGS. 1 and 2 desires to cease applying the brakes in the vehicle 11, air must be allowed to reenter the chamber 57. It is common to provide a small bleed hole 71 in a wall of the chamber for this purpose. It is also common to provide a large hole and an electrically operated valve, as will be described in connection with FIG. 5 to open it to admit air more rapidly. That would require electric cable connected to an electric switch located at some convenient place, such as alongside the pneumatic switch 16.

The connector 36 is shown connected to the tail lights 72 and 73 by a cable 74. Although this cable is indicated as having only two wires, it is to be understood that it may have more to operate the lights 72 and 73 as stop lights and as turn indicators.

The embodiment in FIGS. 1 and 2 can also be operated in a different mode in which the pneumatic switch 16 is always open so that the vacuum line 17 is always connected to the evacuated member 14 and to the booster 46. In fact, in this mode, the switch 16 may be eliminated altogether.

Figure 5:
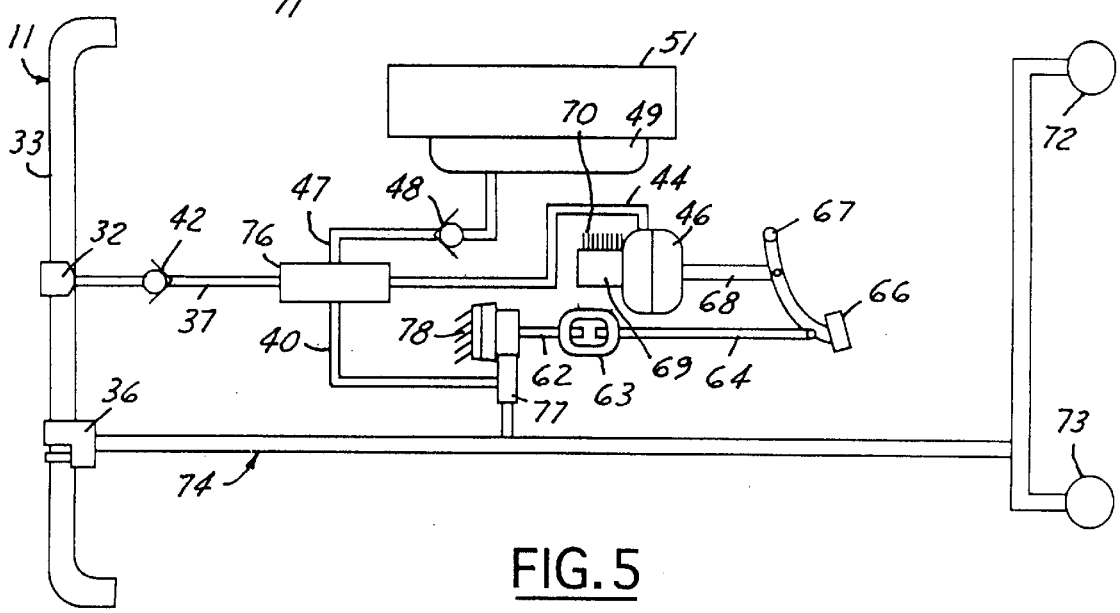
FIG. 5 is a schematic drawing of a supplemental brake system for an alternative embodiment of the invention.

FIG. 5 shows the components arranged for the second mode of operation. In this embodiment, the Tee junctions 41 and 43 are replaced by a manifold 76, which is essentially the equivalent of the Tee junctions. The vacuum line 37 is connected to the manifold 76 as are the lines 40, 44, and 47. The manually operated valve 53 shown in FIG. 3 is not included in the embodiment in FIG. 5. Instead, the line 40 goes to an electrically operated valve 77 located at an entrance to a servo unit 78 and selectively operable to connect the chamber 57 either to the evacuable chamber 14 in the vehicle 13 in FIGS. 1 and 2 or to the atmosphere to control the rod 62 in the same way as does the servo unit 52 in FIGS. 3 and 4. The valve 77 is connected to the cable 74 to be opened every time the driver of the towing vehicle 13 (FIG. 2) steps on the brake pedal 21. In addition, the pneumatic switch 16 in the towing vehicle is either eliminated or is kept open at all times that the vehicle 11 is being towed. As a result, the entire vacuum passageway, all the way through the lines 37 and 40 to the valve 77 and through the line 44 to the booster are evacuated, so that actuation of the brake pedal 66 and the brakes of the vehicle 11 begins as soon as the driver of the vehicle 13 steps on the brake pedal 21, instead of having to wait until air is drawn out of the lines 17, 26, 37, 40, and 44, as was the case in the embodiment in FIG. 3.

Each time the driver lets up on the brake pedal 21 in the vehicle 13 in FIGS. 1 and 2, the electric current through the cables 23, 27, and 74 is turned off, thereby closing the valve 77 and preventing air from continuing to be drawn out of the chamber 57 in the servo unit 78. However, in order to release the rod 62 that controls the brakes of the vehicle 11, air must be readmitted to the chamber 57. This can be done through the bleed hole 71 in a wall of the servo unit or it can be done by arranging the valve 77 so that, when it is not energized to open the passageway 61 to the line 40, when deenergized it opens the passageway 61 to the atmosphere. The valve 77 is thus selectively operable to connect the chamber 57 either to the chamber 14, which serves as a vacuum source, or to the atmosphere to allow air to enter the chamber 57.

While this invention has been described in specific terms, it will be understood by those skilled in braking technology that modifications may be made without departing from the true scope of the invention.

What is claimed is:

1. Supplemental brake means in a first vehicle having a brake system that includes brakes and a brake pedal by which the brakes can be actuated from a source of reduced air pressure in a second vehicle when the second vehicle is connected to the first vehicle to tow the first vehicle, said supplemental brake means comprising:
    (a) servo means rigidly mounted in the first vehicle and operated by reduction of air pressure in the servo means;
    (b) pneumatic connection means through which the source of reduced air pressure in the second vehicle can reduce air pressure in the servo means; and
    (c) mechanical connection means connecting the servo means to the brake pedal to apply force to the brake pedal in a direction to actuate the brakes in response to reduction of air pressure in the servo means.

2. The supplemental brake means of claim 1 comprising valve means connected to the servo means to control the mechanical connection means.

3. The supplemental brake means of claim 2 in which the valve means opens the servo means to the atmosphere to allow air to enter the servo means.

4. The supplemental brake means of claim 2 in which the valve means is electrically operated.

5. The supplemental brake means of claim 1 in which the vehicle comprises power assist means connected to the brake pedal to augment pressure normally applied to the brake pedal to retard movement of the vehicle.

6. In a vehicle having a main brake system that includes brakes, a brake pedal by which the brakes can be actuated, an engine-operated source of reduced air pressure, and booster means pneumatically connected to the engine-operated source and mechanically connected to the brake pedal to assist in operating the brakes in response to selectively unbalanced air pressure in the booster means, supplemental vacuum-operated brake means comprising:
    (a) servo means comprising a chamber with a fixed wall rigidly mounted in the vehicle and a movable wall;
    (b) pneumatic connection means connected to the booster means and the connection means being connected to the engine-operated source via a first check valve, and the connection means being connected to the servo chamber, and the connection means via a second valve being connected with a pneumatic line connectable with an external source of reduced air pressure wherein a:
    (c) control means is connected to the pneumatic connection means to connect the servo chamber to the external source of reduced air pressure to move the movable wall toward the fixed wall; and
    (d) mechanical connection means connecting the movable wall to the brake pedal to apply force to the brake pedal in a direction to actuate the brakes when air pressure in the chamber is reduced.

7. A vehicle as described in claim 6 wherein said control means is activated by an electric signal.

8. A supplemental brake system for a first vehicle to permit operation of the supplemental brake system from a second vehicle that includes a first source of reduced air pressure and control means to control application of the reduced air pressure to the supplemental brake system when the second vehicle is towing the first vehicle, the first vehicle having a main brake system that includes a second source of reduced air pressure, brakes, a brake pedal that moves from a normal position to a braking position in response to application of braking force to the brake pedal, and a vacuum booster unit connected to the brake pedal to be made active by application of the braking force to the brake pedal, the supplemental system comprising:

(a) a vacuum servo unit comprising:
 (i) a chamber
 (ii) a fixed wall rigidly mounted relative to the vehicle,
 (iii) a movable diaphragm forming a movable wall of the chamber and having a normal position;
(b) connection means connecting the movable diaphragm to the brake pedal, whereby the brakes are released when braking force is removed from the brake pedal to allow the movable wall to return to the movable wall's normal position;
(d) selectively operable means connected to the control means in the second vehicle to connect the chamber to and disconnect the chamber from the first source of reduced pressure, whereby the diaphragm is moved to apply braking force to the brake pedal when the selectively operable means connects the chamber to the first source of reduced pressure to move the movable wall away from the normal position; and
(e) venting means operatively associated with the chamber to allow air to reenter the chamber to return the brake pedal to the brake pedal's normal position when the selectively operable means disconnects the chamber from the first source of reduced air pressure.

9. The supplemental brake means of claim 8 in which the venting means is a bleed hole in the fixed wall of the chamber.

10. The supplemental brake means of claim 8 in which the selectively operable means is manually operable.

* * * * *

UNITED STATES PATENT AND TRADEMARK OFFICE
CERTIFICATE OF CORRECTION

PATENT NO.   : 6,460,940 B1
DATED        : October 8, 2002
INVENTOR(S)  : Ernest E. Smith It is certified that error appears in the above-identified patent and that said Letters Patent is hereby corrected as shown below:

<u>Title page,</u>
Item [76], Inventor, please delete "Snmith" and insert -- Smith --

Signed and Sealed this

Fourth Day of February, 2003

JAMES E. ROGAN
*Director of the United States Patent and Trademark Office*